United States Patent

[11] 3,575,443

| [72] | Inventor | Ralph Aguilar<br>Glascow-Cardiff By Sea, Calif. (1068 Santa Fe Drive, Encinnitas, Calif. 92024) |
|---|---|---|
| [21] | Appl. No. | 770,260 |
| [22] | Filed | Oct. 24, 1968 |
| [45] | Patented | Apr. 20, 1971 |

[54] GO GO WHEEL COASTER
1 Claim, 3 Drawing Figs.

[52] U.S. Cl.............................................. 280/206, 280/87.01, 272/33, 280/207
[51] Int. Cl................................................. B62b 11/00
[50] Field of Search.................................. 280/1.1, 87.01, 206, 207; 180/10; D34/15[26]; 272/33

[56] References Cited
UNITED STATES PATENTS

| D.190,038 | 4/1961 | Nickell | D.34/15[26] |
| 1,625,327 | 4/1927 | Moore | 280/207 |
| 2,019,728 | 11/1935 | Ranck | 280/207 |
| 3,260,324 | 7/1966 | Suarez | 180/10 |
| 3,420,545 | 1/1969 | Dittman | 280/207 |
| 3,338,593 | 8/1967 | Gehring | 280/206 |
| 3,380,755 | 4/1968 | Pound | 280/207 |

*Primary Examiner*—Leo Friaglia

ABSTRACT: An amusement ride device for a child or other person. The device including a rotatable outer tire and an inside hoop which is carried by roller bearing means within the tire, the hoop including a transverse handlebar, leg stretch bar against which a rider within the hoop may secure himself by bracing, the hoop remaining in a nonrotating position while the tire rotates during travel across the ground.

Patented April 20, 1971 3,575,443

INVENTOR
RALPH AGUILAR

GO GO WHEEL COASTER

This invention relates generally to amusement ride devices.

A principal object of the present invention is to provide a novel amusement ride device comprising a relatively large hoop within which a rider may sit in upright position while the device travels horizontally across the ground.

Another object of the present invention is to provide a go go wheel coaster wherein the hoop remains in a nonrotating position while being transported horizontally within a rotating tire.

Yet another object of the present invention is to provide a go go wheel coaster wherein a plurality of rollers between the tire and hoop serve as bearing means so to eliminate rotation of the hoop and allow a rider to travel in an upright position.

Still another object of the present invention is to provide a go go wheel coaster wherein a rider may steer the device by changing the balance of his body.

Other objects of the present invention are to provide a go go wheel coaster which is simple in design, inexpensive to manufacture, rugged in construction, easy to use and efficient in operation.

These and other objects will be readily evident upon a study of the following specification together with the accompanying drawing wherein.

Figure 1:
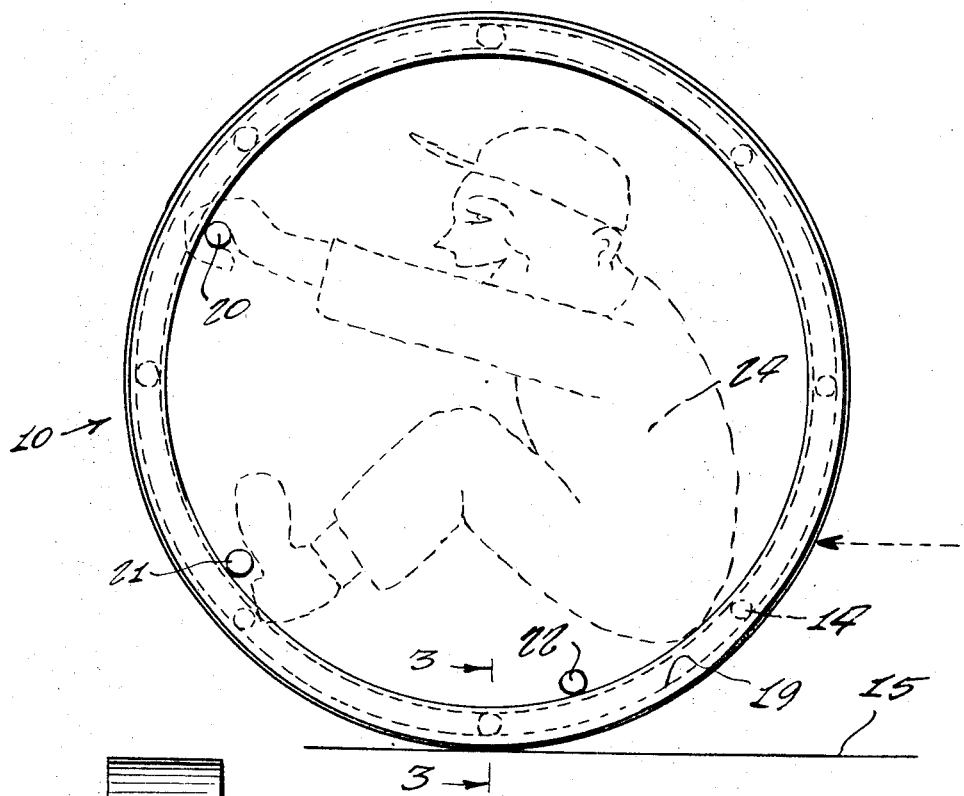
FIG. 1 is a side elevation view of the present invention.

Referring now to the drawing in detail, reference numeral 10 represents a go go wheel coaster, according to the present invention, wherein there is an inner hoop 11 and an outer tire 12 which are maintained in spaced-apart relation by means of a plurality of rollers 13 which serve as bearing means therebetween.

The tire member 12 comprises a ring-configurated member which may be made of solid rubber or the like and having an outer side 14 which contacts a ground 15 along which it is rolled.

The hoop 11 comprises a circular member to each edge of which there is secured a radially outwardly extending flange 16 by means of rivets 17. The flange is provided with a plurality of openings which serve as bearings for shafts 18 upon each of which a roller 13 is carried pivotally free. The roller engages the inner surface 19 of the tire 12.

Figure 2:
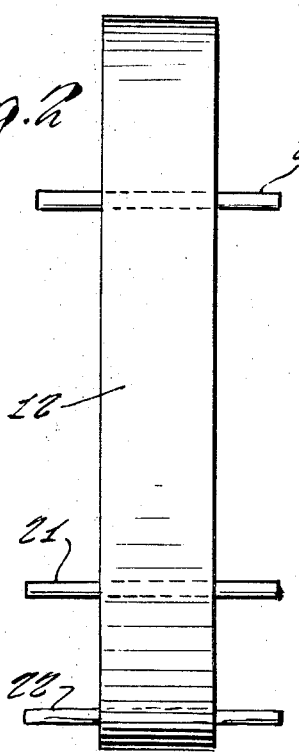
FIG. 2 is an end elevation view thereof.
Figure 3:
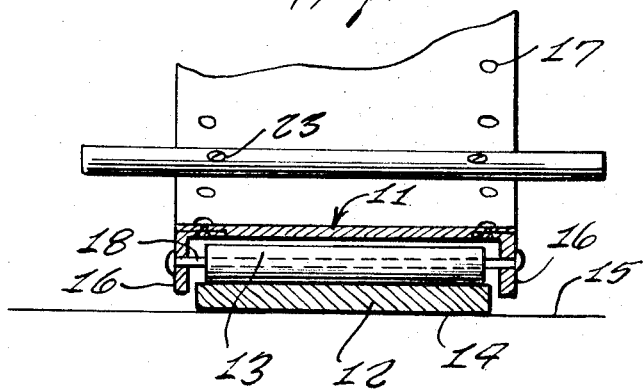
FIG. 3 is an enlarged cross-sectional view taken along the line 3-3 of FIG. 1.

The hoop is provided with a transverse extending handlebar 20, a leg stretch bar 21 and a foot bar 22 each of which may be secured by appropriate rivets or bolts 23 to the hoop. As is shown in FIGS. 2 and 3, these bars have opposite ends which extend beyond the edges of the hoop.

In operative use, a rider 24 seats himself within the interior of the hoop and holds with his hands upon the handlebar ends as shown in FIG. 1. The rider, depending upon his size, may use the leg stretch bar and foot bar for supporting himself therewithin. If the child is too small, as shown in FIG. 1, he may require only two of the bars whereas a larger child will make use of all three bars for supporting himself within the device. The device is urged forwardly so to cause the tire to travel along the surface of the ground 15 while the rider remains in a relatively stationary upright position within the hoop. The child, of course, may assume an inverted position therein if preferred or may sit or stand therein as preferred.

Thus there has been provided an amusement ride device which will provide long hours of active entertainment. The outer tire can be provided with a central extending flange upon its outer side, if preferred, upon which the rider may attempt to balance the device so to allow easier steering, if preferred.

While various changes may be made in the detailed construction, it is understood that such changes will be within the spirit and scope of the present invention as is defined by the appended claims.

I claim:

1. In a wheel coaster, the combination of an outer tire and an inner hoop, said being carried within said tire, and means for said hoop supporting a rider therewithin, means being provided for said hoop to remain in a nonrotating position while said tire rotates during travel, said means comprising a plurality of rollers therebetween having roller bearing characteristics, said tire comprising a circular outer member having an inner peripheral side against which said rollers are in contact engagement, said hoop comprising a circular member having a radially outwardly extending flange along each opposite edge, each said flange providing bearing means for a transverse extending shaft, each of said shafts supporting one of said rollers, said hoop including a plurality of transverse extending bars secured thereto, the opposite ends of each of said bars extending outwardly beyond the edges of said hoop, one of said bars comprising a handlebar, another of said bars comprising a leg stretch bar and a third of said bars comprising a foot bar, said flanges of said hoop extending radially upwardly a distance greater than the radial distance of the inner side of said tire so that said flanges retain said tire upon said rollers so to prevent slipping off sidewardly off said rollers, and said flanges being spaced apart from each other a greater distance than the greatest width of said tire.